US010669415B2

(12) United States Patent
Thimonier

(10) Patent No.: US 10,669,415 B2
(45) Date of Patent: Jun. 2, 2020

(54) THERMOPLASTIC ELASTOMER COMPOSITION FOR ENCAPSULATION

(71) Applicant: SAINT-GOBAIN GLASS FRANCE, Courbevoie (FR)

(72) Inventor: Sylvain Thimonier, Estrees Saint Denis (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 664 days.

(21) Appl. No.: 15/127,594

(22) PCT Filed: Mar. 16, 2015

(86) PCT No.: PCT/FR2015/050634
§ 371 (c)(1),
(2) Date: Sep. 20, 2016

(87) PCT Pub. No.: WO2015/145021
PCT Pub. Date: Oct. 1, 2015

(65) Prior Publication Data
US 2017/0130043 A1 May 11, 2017

(30) Foreign Application Priority Data
Mar. 26, 2014 (FR) ...................................... 14 52580

(51) Int. Cl.
| | | |
|---|---|---|
| *B29C 71/00* | (2006.01) | |
| *C08L 25/10* | (2006.01) | |
| *B29C 48/155* | (2019.01) | |
| *C08L 53/02* | (2006.01) | |
| *C08F 255/04* | (2006.01) | |
| *C08F 287/00* | (2006.01) | |
| *C03C 17/32* | (2006.01) | |
| *B29C 48/154* | (2019.01) | |
| *B29C 48/92* | (2019.01) | |
| *B29C 45/14* | (2006.01) | |
| *C08K 5/54* | (2006.01) | |
| *B29K 9/06* | (2006.01) | |
| *B29K 709/08* | (2006.01) | |

(52) U.S. Cl.
CPC ........ *C08L 25/10* (2013.01); *B29C 45/14434* (2013.01); *B29C 48/154* (2019.02); *B29C 48/155* (2019.02); *B29C 48/92* (2019.02); *C03C 17/32* (2013.01); *C08F 255/04* (2013.01); *C08F 287/00* (2013.01); *C08L 53/02* (2013.01); *B29C 2948/92704* (2019.02); *B29K 2009/06* (2013.01); *B29K 2709/08* (2013.01); *C08K 5/54* (2013.01); *C08L 2205/025* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 4,822,857 A | 4/1989 | Gorman et al. | |
| 2004/0238998 A1* | 12/2004 | Bordeaux | B32B 17/10036 264/234 |
| 2005/0279140 A1* | 12/2005 | Adzima | C03C 25/26 65/453 |
| 2006/0030667 A1* | 2/2006 | Yalvac | C08L 23/04 525/191 |
| 2011/0155975 A1* | 6/2011 | Chakravarti | C08J 5/18 252/589 |
| 2012/0107614 A1* | 5/2012 | Blum | B05D 5/083 428/411.1 |
| 2012/0199199 A1 | 8/2012 | Wood et al. | |
| 2013/0116371 A1* | 5/2013 | Oktavia | C08L 23/02 524/404 |
| 2013/0244367 A1* | 9/2013 | Kohara | C08F 287/00 438/64 |
| 2014/0369063 A1* | 12/2014 | Kleo | F21V 33/0012 362/551 |

FOREIGN PATENT DOCUMENTS

| | | |
|---|---|---|
| DE | 3530364 C1 | 1/1987 |
| EP | 0322054 A2 | 6/1989 |
| EP | 2623526 A1 | 8/2013 |
| WO | 2011/068597 A1 | 6/2011 |

OTHER PUBLICATIONS

International Search Report dated Jun. 26, 2015 in PCT/FR2015/050634 filed Mar. 16, 2015.

\* cited by examiner

Primary Examiner — Matthew J Daniels
Assistant Examiner — Mohammad M Ameen
(74) Attorney, Agent, or Firm — Oblon, McClelland, Maier & Neustadt, L.L.P.

(57) ABSTRACT

A thermoplastic composition for overmolding of an elastomer on a substrate made of mineral glass includes: (1) from 50 to 70% by weight of at least one thermoplastic elastomer (TPE) chosen from copolymers comprising styrene blocks (TPE-Ss), (b) from 20 to 35% by weight of a polyolefin chosen from propylene homopolymers (PPs), ethylene homopolymers (PEs) and copolymers of propylene and ethylene, and (c) at least 7% by weight of a functional alkoxysilane. The percentages are expressed with respect to the sum of the components (a), (b) and (c).

25 Claims, No Drawings

THERMOPLASTIC ELASTOMER COMPOSITION FOR ENCAPSULATION

The present invention relates to an encapsulation composition based on a thermoplastic elastomer having a high content of coupling agents, making possible the encapsulation of motor vehicle glazings without a prior priming stage.

In the industrial field of motor vehicle glazings, the term "encapsulation" denotes a process or a stage of overmolding a polymer material around the perimeter of a glazing. The material is injected in the fluid state into a mold forming a leaktight frame around the edge of the glazing. After curing the material by a polymerization and/or crosslinking reaction (case of thermosetting polymers) or by cooling (case of thermoplastic polymers), the mold is opened and removed, leaving, at the periphery of the glazing, a profiled strip in contact with the edge and with at least one of the two faces of the glazing, often with both faces of the glazing.

The polymer forming the profiled strip is often an elastomer capable of acting as seal between the glazing and the bodywork. Polymers which are not elastomers may, however, also be overmolded by encapsulation to perform other functions. The profiled strip obtained is then generally a composite strip comprising both elastomer components and nonelastomer components juxtaposed.

The encapsulation stage is generally preceded by a stage of cleaning and activation of the surface to be overmolded, at the periphery of the glazing, and then a primer is often applied to the activated region intended to come into contact with the overmolded profiled strip.

Thermoplastic elastomers (TPEs), and in particular styrene-based TPEs (TPE-Ss) have been used for a long time for the encapsulation of motor vehicle glazings, that is to say for the overmolding by injection of an elastomer seal covering at least a part of the circumference of the glazing.

In order to guarantee sufficient adhesion of the seal to the glazing, it is generally essential to deposit there, before the stage of overmolding by injection, a thin layer of primer (see, for example EP 0570282, U.S. Pat. No. 6,348,123 and EP 2162487).

This stage of application of a primer layer is problematic. It is very difficult to automate and is thus most of the time carried out manually, which considerably increases the production cost. Primer compositions comprise highly reactive, toxic and flammable products, such as isocyanates and organic solvents, and the handling thereof by operators has to be carried out under a hood and presents obvious health, safety and environmental problems.

Furthermore, the primer layer applied manually often requires a subsequent stage of preheating the glass before the encapsulation stage.

It would thus be desirable to be able to automate this priming stage, indeed even to do without it, without the adhesion of the seal to the glazing being found to be damaged thereby.

The applicant company has developed a composition for the overmolding of elastomer seals on glazings, in particular motor vehicle glazings, which makes it possible to achieve this objective, that is to say to overmold said composition directly on the glazing, without prior application of a primer layer.

A subject matter of the present patent application is thus a thermoplastic composition for the overmolding of an elastomer on a substrate made of mineral glass, comprising:
(a) from 50 to 70% by weight of at least one thermoplastic elastomer (TPE) chosen from copolymers comprising styrene blocks (TPE-Ss),
(b) from 20 to 35% by weight, preferably from 22 to 30% by weight, of a polyolefin chosen from propylene homopolymers (PPs), ethylene homopolymers (PEs) and copolymers of propylene and ethylene,
(c) at least 7% by weight, preferably from 8 to 20% by weight, in particular from 9 to 15% by weight, of a functional alkoxysilane, these percentages being expressed with respect to the sum of the components (a), (b) and (c).

The thermoplastic composition of the present invention thus comprises three essential ingredients:
a styrene thermoplastic elastomer contributing the elastic properties (component a),
a polyolefin (component b), the main role of which is to increase the hardness of the final overmolded material, and
a functional silane (component c) in a concentration greater than those normally used in encapsulation compositions.

The TPE-Ss which can be used in the present invention mainly comprise the following families:
SBS (styrene-butadiene-styrene): block copolymers comprising a central polybutadiene block framed by two polystyrene blocks,
SEBS: (styrene-ethylene-butadiene-styrene): copolymers obtained by hydrogenation of the SBSs,
SEPS: (styrene-ethylene-propylene-styrene): copolymers comprising a central poly(ethylene-propylene) block flanked by two polystyrene blocks,
SEEPS: (styrene-ethylene-ethylene-propylene-styrene): copolymers obtained by hydrogenation of styrene-butadiene/isoprene-styrene copolymers.

These polymers are commercially available as grades comprising inorganic fillers but also in the form of filler-free materials.

In the present invention, use will be made of TPEs essentially devoid of fillers or comprising less than 5% of inorganic fillers, preferably less than 2% of inorganic fillers.

They are available, for example, under the following trade names: Dryflex (Hexpol TPE), Evoprene (AlphaGary), Sofprene (SO.F.TER), Laprene (SO.F.TER), Asaprene (Asahi Kasei) or Nilflex (Taroplast).

These products can comprise a certain fraction of organic lubricants, viscosity reducers or plasticizers which is regarded, in the present patent application, as forming part of the TPE-S fraction of the thermoplastic composition.

The melting point of the TPE-Ss is advantageously between 180° C. and 210° C., in particular between 190° C. and 200° C.

They must be sufficiently fluid in the molten state to be able to be injection molded. However, it is impossible to give precise information with regard to their viscosity in the molten state as this depends not only on the temperature, but also on the shear force to which the polymers are subjected. Suppliers generally provide "for injection molding" grades.

The compositions of the present invention comprise from 50 to 70% by weight, preferably from 55 to 68% by weight and ideally from 60 to 65% by weight, of TPE-S, these percentages being with respect to the sum of the components (a), (b) and (c).

In order to be able to function satisfactorily as motor vehicle glazing seal, the overmolded part obtained at the end of the overmolding process of the present invention preferably has a Shore A hardness of between 50 and 80, in particular between 60 and 75.

The use of TPE-S in combination with a functional silane alone does not make it possible to obtain these hardness values. This is why it is necessary to incorporate, in the TPE-S, a polyolefin compatible with the latter. This polyolefin is a propylene or ethylene homopolymer or a propylene and ethylene copolymer. Its weight-average molecular weight is generally less than 100 000 g/mol, preferably of between 20 000 and 60 000 g/mol.

Mention may be made, as examples of commercially available products, of the polypropylenes sold under the Hostalen, Sabic, Ineos or Borealis names. These products are essentially devoid of inorganic fillers but may comprise small amounts, generally less than 5% by weight, of plasticizing and/or lubricating agents and less than 1% by weight of stabilizing agents.

The third essential component of the composition of the present invention is a functional silane, namely an organic molecule formed of a silicon atom bonded to at least one, preferably to at least two, hydrolyzable organic groups, typically alkoxy groups, and to at least one nonhydrolyzable organic group, typically an alkyl group carrying a functional group which is reactive with regard to the substrate to be overmolded and/or the components (a) and (b) of the thermoplastic composition.

Use will preferably be made of trialkoxysilanes and in particular triethoxysilanes and trimethoxysilanes, the latter being particularly preferred as they are more reactive than the first.

The reactive functional group carried by the alkyl group is preferably a vinyl, acryloyl, methacryloyl, epoxy, mercapto or amino functional group. The alkyl group can, of course, carry more than just one reactive functional group.

The functional alkoxysilane is thus preferably chosen from aminosilanes, epoxysilanes, vinylsilanes, mercaptosilanes and (meth)acryloylsilanes and mixtures of these and is preferably a mixture of at least two silanes chosen from aminosilanes, vinylsilanes and epoxysilanes.

Mention may be made, as the most advantageous functional silanes, of methacryloyloxypropyltrimethoxysilane, N-phenylaminopropyltrimethoxysilane, N-(2-aminoethyl)-11-aminoundecyltrimethoxysilane, 3-glycidyloxypropyltrimethoxysilane, 3-aminopropyltrimethoxysilane, N-(2-aminoethyl)-3-aminopropyltrimethoxysilane or 3-mercaptopropyltrimethoxysilane.

Functional silanes are coupling agents which have been well known for decades. They are generally used in small amounts, that is to say in a proportion of less than 3% by weight, generally in a proportion of less than 2% by weight, in order to improve the adhesion between polymer materials and inorganic materials, such as mineral glasses.

In the present invention, these molecules, which are very expensive, are used in concentrations significantly higher than in the state of the art. The use of large amounts of coupling agent admittedly undesirably increases the cost price of the thermoplastic compositions intended for the overmolding but this additional cost is largely compensated for by the possibility of dispensing with the manual priming stage and the wage bills which are associated with it.

The coupling agents are preferably incorporated in the thermoplastic composition in the pure form, that is to say undissolved in an organic or aqueous solvent, so that the thermoplastic composition intended for the overmolding is devoid of volatile organic solvents.

The thermoplastic compositions of the present invention can furthermore comprise an additional coupling agent, different from the functional silanes described above, chosen from organic polymers grafted with maleic anhydride (MAH). This coupling agent is generally used in lower amounts than that of the functional silane or silanes. The thermoplastic composition of the present invention preferably comprises from 0.5 to 10% by weight, preferably from 1 to 5% by weight, with respect to the sum of (a)+(b)+(c), of at least one organic polymer grafted with maleic anhydride (MAH).

These organic anhydride-grafted polymers must be compatible with the TPE-Ss/polyolefins blend of the thermoplastic composition and are preferably chosen from maleic anhydride-grafted TPE-Ss and maleic anhydride-grafted polyolefins.

Use will preferably be made of organic polymers grafted with MAH having a polymer part identical to those of the TPE-S or polyolefin. In other words, when the TPE-S is an SBS, use will preferably be made of an SBS grafted with MAH and, when the polyolefin is a propylene homopolymer, use will preferably be made of a polypropylene grafted with MAH.

These polymers grafted with MAH are known and are commercially available, for example under the Amplify (The Dow Chemical Company) and Scona (Byk) names.

The thermoplastic composition of the present invention may be prepared, immediately before the overmolding process, by introducing by means of volumetric metering devices the appropriate amounts of the ingredients into an injection screw or an extruder.

It may also be prepared by blending the various ingredients in an appropriate mixer and may then be stored, preferably under cold conditions, before being used.

Other subject matters of the present invention are two processes for overmolding such a thermoplastic composition on a substrate, in particular made of organic or mineral glass, especially made of mineral glass.

These processes are implemented in particular to form seals at the periphery of motor vehicle glazings made of mineral glass or made of polymer.

The term "process for overmolding" encompasses processes for overmolding by injection, where the hot and fluidized thermoplastic composition is injected into a mold cavity into which has been inserted the part of a substrate intended to come into contact with the thermoplastic composition, and also processes for overmolding by extrusion, where a hot and plasticized thermoplastic composition is extruded, generally in the form of a tube of material, in contact with a substrate. In the processes for overmolding by extrusion, the composition is thus not injected into a mold but there exists some extrusion processes where the thermoplastic composition is shaped, after extrusion and before curing, by means of a mold part.

The process for overmolding by injection of the present invention comprises the following three successive stages:
(1) heating a thermoplastic composition according to the invention to a temperature sufficient to obtain a viscosity of less than 1000 Pa·s$^{-1}$;
(2) injecting the heated thermoplastic composition into a mold cavity into which is inserted a part of a substrate, preferably made of mineral glass, in particular the edge of a glazing, and
(3) removing the glazing-overmolding assembly from the mold.

A process for overmolding by extrusion of the present invention comprises the following two successive stages:
(1) heating a thermoplastic composition according to the invention in an extruder up to a temperature sufficient to obtain a viscosity of less than 1000 Pa·s$^{-1}$,
(2) extruding the heated thermoplastic composition in contact with a substrate, preferably made of mineral glass, in particular the edge of a glazing.

As will be shown below in the examples, heating the thermoplastic composition according to the invention and bringing it into contact with the surface of a substrate made of glass are sufficient to obtain, after a certain reaction period, satisfactory adhesion between the polymer phase and the substrate.

It is thus unnecessary to subject the bare substrate to a pretreatment or the resulting product to a post treatment.

In an advantageous embodiment of the process for overmolding according to the invention, the surface of the substrate is thus not subjected to any chemical or physical pretreatment. In particular, it does not receive any priming coating intended to improve the adhesion between the overmolded polymer and the substrate. The part of the substrate which comes into contact with the thermoplastic composition is thus devoid of an organic priming layer and, during stage (2) of injection or extrusion, the heated thermoplastic composition comes directly into contact with the substrate, preferably with the mineral glass forming the glazing.

However, it is possible to envisage carrying out certain stages of activation or preparation of the surface to be overmolded, generally with the aim of improving the adhesion of the polymer.

Thus, the process for overmolding according to the invention can additionally comprise a stage of physical pretreatment of the surface of the substrate to be overmolded with a plasma or a corona discharge, preferably an atmospheric plasma.

Use can also advantageously be made of a stage of chemical pretreatment of the surface to be overmolded by application of a functional silane and/or of an adhesion promoter chosen from organic titanates, zirconates and zircoaluminates. The functional silanes can in principle be chosen from those incorporated in the thermoplastic composition. Organic titanates, zirconates and zircoaluminates which can be used for this chemical pretreatment of the surface are known and are available commercially, for example under the Tyzor® trade name, from Dorf Ketal (titanates and zirconates), and the Manchem® trade name (zircoaluminates).

Although a heat treatment prior to or following the process for overmolding is not essential, it may advantageously accelerate the chemical reactions responsible for the curing and for the adhesion of the polymer phase to the substrate.

The process according to the invention thus additionally advantageously comprises, after the stage of removing from the mold or of extrusion, or else before the stage of injection or of extrusion of the thermoplastic composition, a stage of heating the substrate or the part of the substrate overmolded by the polymer.

This preheating or post-heating preferably takes place at a temperature of greater than 50° C., in particular of between 60 and 150° C., ideally between 70 and 100° C.

EXAMPLES

The following thermoplastic blend is prepared on an injection station using volumetric metering devices:
63 parts by weight of an SBS copolymer,
25 parts by weight of polypropylene homopolymer,
5 parts by weight of 3-aminopropyltriethoxysilane,
5 parts by weight of vinyltrimethoxysilane,
1 part by weight of polypropylene grafted with maleic anhydride, and
1 part by weight of SEBS grafted with maleic anhydride.

These ingredients are blended and heated to a temperature from 200° C. to 250° C. (temperature of the screw). The molten material is injected into an overmolding mold into which is inserted a glazing which has not been subjected to any pretreatment. Neither the mold nor the glazing is independently heated.

After approximately one minute, the glazing overmolded with a seal is removed from the mold and stored at a temperature of 23° C. and a relative humidity of 50% for seven days, during which period the reaction of the coupling agents continues.

After storing for seven days, the adhesion of the seal to the glazing is evaluated by means of a 90° peel test (pull rate: 100 mm/minute). The overmolded glazing is subsequently subjected to wet poultice aging (14 days at 70° C., relative humidity 95%, then thermoshock by cooling for 2 hours at −20° C.) and the adhesion test is repeated (example 1).

The above procedure is repeated while implementing the following variants:

Example 2 the glazing is preheated to 80° C. before the stage of overmolding the thermoplastic composition;

Example 3 the region of the glazing intended to come into contact with the thermoplastic composition is subjected to an atmospheric plasma treatment;

Example 4 the overmolded glazing is subjected, after removing from the mold, to a stage of postcuring at 80° C. for an hour;

Example 5 a chemical activation composition, comprising a solution of 2% of N-(3-(trimethoxysilyl)propyl)-1,2-ethanediamine and 2% of 3-trimethoxysilylpropane-1-thiol in isopropanol (Betawipe VP 04604 from Dow Automotive), is applied manually, before the insertion of the glazing into the injection mold;

Example 6 a solution of 2% of N-(3-(trimethoxysilyl)propyl)-1,2-ethylenediamine and 2% of tris(dodecylbenzenesulfonato-O)(propan-2-olato)titanium in a mixture of organic solvents (Sika Aktivator) is applied manually, before the insertion of the glazing into the injection mold.

The type of failure and the peel strength, recorded for examples 1 to 6, before and after the stage of wet poultice aging, are shown in table 1.

TABLE 1

| | (examples according to the invention) | | | |
| --- | --- | --- | --- | --- |
| | Before aging | | After aging | |
| | Failure | Peel strength (N/cm) | Failure | Peel strength (N/cm) |
| Example 1 | adhesive | >30 | cohesive | >35 |
| Example 2 | cohesive | >40 | cohesive | >50 |
| Example 3 | adhesive | >35 | cohesive | >40 |

TABLE 1-continued (examples according to the invention)

|  | Before aging | | After aging | |
|---|---|---|---|---|
|  | Failure | Peel strength (N/cm) | Failure | Peel strength (N/cm) |
| Example 4 | cohesive | >30 | cohesive | >40 |
| Example 5 | adhesive | >40 | cohesive | >40 |
| Example 6 | adhesive | >30 | cohesive | >40 |

It is observed that the overmolding composition according to the invention gives better results after a period of hot aging. These results indicate that the reaction responsible for the polymer/glass adhesion certainly continues well after removal from the mold, possibly even after the first period of storage at ambient temperature for seven days.

After the aging period, all the failures are of "cohesive" type (polymer/glass adhesion is greater than the internal cohesion of the polymer material), which is a very difficult result to obtain with adhesion primers.

When examples 1 to 6 above are repeated but using one fifth of the amount of silanes, that is to say one part by weight of 3-aminopropyltriethoxysilane and one part by weight of vinyltrimethoxysilane, the adhesion results presented below in table 2 are obtained.

TABLE 2

(comparative examples)

| | Before aging | |
|---|---|---|
| | Failure | Peel strength (N/cm) |
| Comparative example 1 | adhesive | >5 |
| Comparative example 2 | adhesive | >20 |
| Comparative example 3 | adhesive | >10 |
| Comparative example 4 | adhesive | >20 |
| Comparative example 5 | adhesive | >5 |
| Comparative example 6 | adhesive | >5 |

It is observed that all the failures are of adhesive type and that the peel strengths are inadequate (less than 30 N/cm).

The invention claimed is:

1. A process for overmolding by injection molding of a thermoplastic composition over a glazing, the process comprising:
   (1) heating a thermoplastic composition comprising:
      (a) from 50 to 68% by weight of at least one thermoplastic elastomer (TPE), which is a copolymer comprising styrene blocks (TPE-Ss);
      (b) from 20 to 35% by weight of a polyolefin selected from the group consisting of propylene homopolymers (PPs), ethylene homopolymers (PEs), and copolymers of propylene and ethylene; and
      (c) at least 8% by weight of a functional alkoxysilane, wherein the percentages are with respect to the sum of the components (a), (b) and (c),
   to a temperature sufficient to obtain a viscosity of less than 1000 Pa·s$^{-1}$, thereby producing a heated thermoplastic composition;
      (2) injecting the heated thermoplastic composition into a mold cavity into which is inserted an edge of the glazing, thereby producing a glazing-overmolding assembly; and
      (3) removing the glazing-overmolding assembly from the mold,
   wherein apart of the glazing which comes into contact with the thermoplastic composition is devoid of an organic priming layer, and wherein the heated thermoplastic composition comes directly into contact with the glazing.

2. A process for overmolding by extrusion of a thermoplastic composition onto a glazing, the process comprising:
   (1) heating a thermoplastic composition comprising:
      (a) from 50 to 68% by weight of a thermoplastic elastomer (TPE), which is a copolymer comprising styrene blocks (TPE-Ss);
      (b) from 20 to 35% by weight of a polyolefin selected from the group consisting of propylene homopolymers (PPs), ethylene homopolymers (PEs), and copolymers of propylene and ethylene; and
      (c) at least 8% by weight of a functional alkoxysilane, wherein the percentages are with respect to the sum of the components (a), (b) and (c),
   in an extruder, up to a temperature sufficient to obtain a viscosity of less than 1000 Pa·s$^{-1}$, thereby producing a heated thermoplastic composition; and
      (2) extruding the heated thermoplastic composition in contact with an edge of the glazing,
   wherein a part of the glazing which comes into contact with the thermoplastic composition is devoid of an organic priming layer, and wherein the heated thermoplastic composition comes directly into contact with the glazing.

3. The process as claimed in claim 1, further comprising heating the overmolded glazing.

4. The process as claimed in claim 1, further comprising:
   before injecting the heated thermoplastic composition, heating the edge of the glazing to be overmolded.

5. The process as claimed in claim 1, further comprising:
   physically pretreating a surface of the glazing to be overmolded with a plasma or a corona discharge.

6. The process as claimed in claim 2, further comprising heating the overmolded glazing.

7. The process as claimed in claim 2, further comprising a stage of heating the edge of the glazing before the stage of extruding.

8. The process as claimed in claim 2, further comprising a stage of physical pretreatment of a surface of the glazing to be oveiinolded with a plasma.

9. The process as claimed in claim 1, wherein the thermoplastic composition further comprises from 0.5 to 10% by weight with respect to the sum of (a)+(b)+(c), of an organic polymer grafted with maleic anhydride (MAH).

10. The process as claimed in claim 9, wherein the organic polymer grafted with maleic anhydride is selected from the group consisting of a TPE-S grafted with maleic anhydride and a polyolefin grafted with maleic anhydride.

11. The process as claimed in claim 1, wherein the functional alkoxysilane is at least one selected from the group consisting of an aminosilane, an epoxysilane, a vinylsilane, a mercaptosilane and a (meth)acryloyisilane.

12. The process as claimed in claim 1, wherein the thermoplastic composition is devoid of a volatile organic solvent.

13. The process as claimed in claim 1, wherein the thermoplastic composition comprises:
   (b) from 22 to 30% by weight of the polyolefin.

14. The process as claimed in claim 1, wherein the thermoplastic composition comprises:
   (c) from 8 to 20% by weight of the functional alkoxysilane.

15. The process as claimed in claim 1, wherein the thermoplastic composition further comprises from 1 to 5% by weight, with respect to the sum of (a)+(b)+(c), of an organic polymer grafted with maleic anhydride (MAH).

16. The process as claimed in claim 1, wherein the functional alkoxysilane is a mixture of at least two silanes selected from the group consisting of an aminosilane, a vinylsilane and an epoxysilane.

17. The process as claimed in claim 2, wherein the thermoplastic composition further comprises from 0.5 to 10% by weight with respect to the sum of (a)+(b)+(c), of an organic polymer grafted with maleic anhydride (MAH).

18. The process as claimed in claim 17, wherein the organic polymer grafted with maleic anhydride is selected from the group consisting of a TPE-S grafted with maleic anhydride and a polyolefin grafted with maleic anhydride.

19. The process as claimed in claim 2, wherein the functional alkoxysilane is at least one selected from the group consisting of an aminosilane, an epoxysilane, a vinylsilane, a mercaptosilane and a (meth)aciyloylsilane.

20. The process as claimed in claim 2, wherein the thermoplastic composition is devoid of a volatile organic solvent.

21. The process as claimed in claim 2, wherein the thermoplastic composition comprises:
   (b) from 22 to 30% by weight of the polyolefin.

22. The process as claimed in claim 2, wherein the thermoplastic composition comprises:
   (c) from 8 to 20% by weight of the functional alkoxysilane.

23. The process as claimed in claim 2, wherein the thermoplastic composition further comprises from 1 to 5% by weight, with respect to the sum of (a)+(b)+(c), of an organic polymer grafted with maleic anhydride (MAH).

24. The process as claimed in claim 2, wherein the functional alkoxysilane is a mixture of at least two silanes selected from the group consisting of an aminosilane, a vinylsilane and an epoxysilane.

25. The process as claimed in claim 1, wherein the thermoplastic composition comprises:
   (a) from 50 to 65% by weight of the thermoplastic elastomer (TPE); and
   (c) from 9 to 15% by weight of the functional alkoxysilane.

\* \* \* \* \*